Feb. 11, 1964     W. SOMMER     3,120,983
BEARING ARRANGEMENT FOR A SPINNING MACHINE
Filed April 4, 1961     3 Sheets-Sheet 1

INVENTOR
Walter Sommer

Feb. 11, 1964 W. SOMMER 3,120,983
BEARING ARRANGEMENT FOR A SPINNING MACHINE
Filed April 4, 1961 3 Sheets-Sheet 2

INVENTOR
Walter Sommer

Feb. 11, 1964   W. SOMMER   3,120,983
BEARING ARRANGEMENT FOR A SPINNING MACHINE
Filed April 4, 1961   3 Sheets-Sheet 3

INVENTOR
Walter Sommer
By Richard Ernst
Agt

United States Patent Office 3,120,983
Patented Feb. 11, 1964

3,120,983
BEARING ARRANGEMENT FOR A SPINNING MACHINE
Walter Sommer, Leonberg, Wurttemberg, Germany, assignor to SKF Kugellagerfabriken Gesellschaft mit beschrankter Haftung, Stuttgart-Bad Cannstatt, Germany, a company of Germany
Filed Apr. 4, 1961, Ser. No. 100,724
Claims priority, application Germany July 26, 1960
6 Claims. (Cl. 308—187.1)

The present invention relates to textile machinery, and is more particularly concerned with a bearing arrangement for the bottom rolls of drafting frames and like spinning machines.

The driven bottom rolls of a plurality of drafting mechanisms are commonly combined into a shaft-like structure which extends over the entire length of the machine and is supported at a plurality of closely spaced points in bearing brackets or similar supports. Antifriction bearings are of necessity interposed between the supports and the bottom rolls, and needle or roller bearings are preferred because of the small space occupied by them, and because of their reliability under proper maintenance care.

The installation of a shaft-like structure in a multiplicity of axially spaced bearing supports is difficult because of alignment problems which may be present originally, or which may develop during operation. It is known to provide the bearings with an outer bearing ring the bearing face of which is cambered and thus permits some angular displacement of the shaft axis relative to the individual bracket or other support. It is necessary to prevent rotation and axial displacement of the outer bearing ring, and this is achieved in the known arrangement by means of a pin member which is radially inserted in corresponding openings of the ring and of the bracket. In this arrangement the axial spacing of the brackets on the spinning machine must be very precisely correlated with the spacing of the bearing rings so that the respective openings for the fastening pin members will register. The initial alignment of the brackets is time consuming, and the aligned position is not always readily maintained under production conditions.

The primary object of this invention is the provision of a bottom roll arrangement with needle or roller bearings which permits fast and simple installation of a shaft-like assembly of axially consecutive bottom rolls.

It is a more specific object of the invention to provide a bearing arrangement in which an outer bearing ring with a cambered bearing face may be employed to achieve the well-known advantages thereof, but without requiring precise spacing of the bearing brackets.

Other objects and many of the attendant advantages of this invention will be readily appreciated as the same becomes better understood by reference to the following detailed description of preferred embodiments thereof when considered in connection with the accompanying drawings, wherein.

Figure 1:
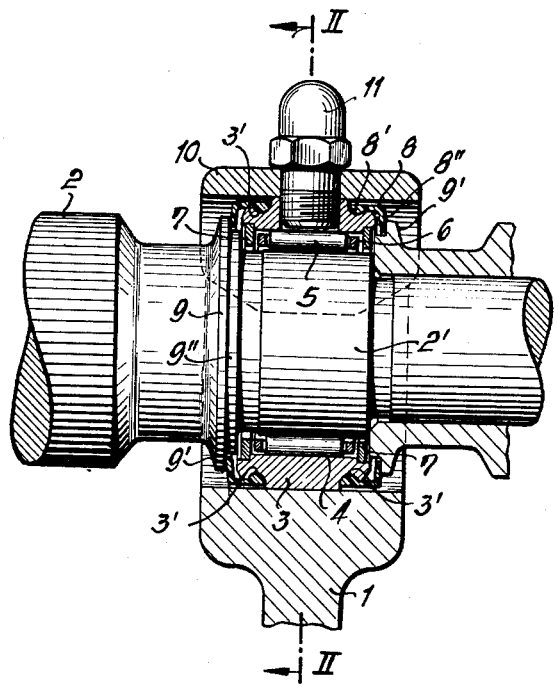
FIG. 1 shows a bearing arrangement of the invention in side elevational axial section.
Figure 2:
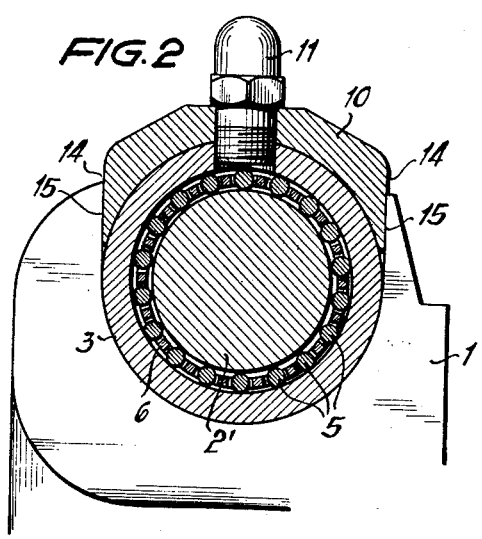
FIG. 2 shows the apparatus of FIG. 1 in radial front-elevational section on the line II—II.
Figure 3:
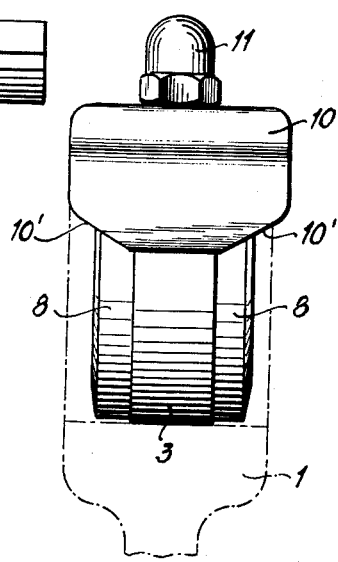
FIG. 3 is a fragmentary side-elevational view of the apparatus of FIG. 1.

Referring now to the drawing in detail, and initially to FIGS. 1 to 3, there is shown one of a plurality of bearing brackets 1 each of which provides a support for the bottom roll assembly composed of a plurality of bottom rolls 2 of which only two adjacent ones are partly seen in FIG. 1 and which jointly constitute a shaft-like structure. A cylindrical face 2' of each bottom roll 2 constitutes the inner race or ring of an antifriction bearing which also includes an outer ring 3 and bearing needles 5 and a cage 6 interposed between the bearing rings. The bearing face 4 of the outer ring 3 is cambered to permit smooth operation of the bearing even in the event of a slight angular misalignment of the bearing rings.

The axial position of the needles 5 and of the cage 6 is substantially fixed by spacer rings 7 which are fastened to or integral with the outer bearing ring 3. The outer ring 3 has two annular open recesses 3' in the axial end portions of its circumferential face. Each recess is engaged by a conforming portion 8' of a resilient sealing member 8. The sealing member also has an annular lip portion 8" which is axially spaced from the radial end face of the outer bearing ring 3 and extends toward the bearing axis. The lip portion 8" resiliently abuts against a radial face of a flange 9 which is integral with a roll 2. The sliding engagement of the lip portion 8" under its resilient force with the face of the flange 9 prevents the escape of lubricant from the bearing, and also prevents the entry of atmospheric contaminants such as dust and lint.

The other face 9' of the flange 9 outside the bearing is obliquely inclined in a direction radially inward and away from the bearing proper so as not to favor the deposition of lint in a location adjacent the bearing. If lint and fibers should still be deposited on the flange 9, they can readily be pulled off by means of a hook-shaped wire or the like without any danger of injury to the sealing member 8 and its lip portion 8".

The bearing structure described so far has a radial plane of symmetry, and there is a flange 9 on each side of the bearing space proper. The working faces of the bottom rolls 2 extend from the flanges 9 in a direction away from the bearing illustrated in FIG. 1, and it will be understood that the working face of each bottom roll is axially flanked by a flange 9 on either side.

As best seen in FIG. 2, the bracket 1 has an upwardly open recess, the bottom of which is cylindrical whereas the sides 15 are flat, and tangential to the cylindrical bottom. They slightly diverge in an upward direction. The bottom of the recess conforms to the cylindrical external face of the outer bearing ring 3. A cover 10 is attached to the outer bearing ring 3 by means of a grease nipple 11 which is externally threaded and radially passes through corresponding threaded openings of the cover 10 and of the ring 3. The cover 10 extends fully over the open top of the recess in the bracket 1, and it has flat sides 14 which conform with the flat sides 15 of the recess.

As better seen from FIGS. 1 and 3, the axial length of the cover 10 is somewhat greater than that of the recess in the bracket so that even if there shold be some axial misalignment between the bracket 1 and the bottom rolls 2, the cover 10 still completely covers the recess in the bracket 1 and protects the bearing as seen in FIG. 3 in which an axially misaligned bracket 1 is indicated in phantom view. The circumferential end portions of the cover 10 are cut off in such a manner as to provide end faces 10' which are obliquely inclined relative to the roll axis and tend to shed accumulated lint or other potential mechanical bearing contaminants.

Figure 4:
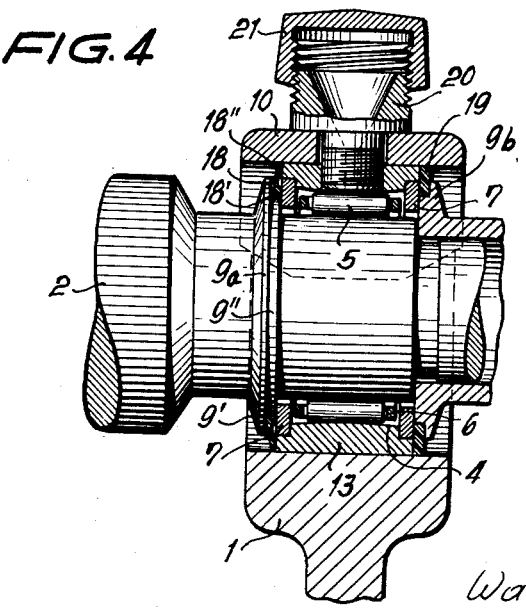
FIG. 4 shows another embodiment of the bearing arrangement of the invention in a view corresponding to that of FIG. 1.

Another embodiment of the bearing arrangement of the invention is shown in axially sectional view in FIG. 4. In this bearing arrangement the outer bearing ring 13 does not carry a sealing member, but is only provided with two spacer rings 7 on either side of the bearing needles 5 in the cage 6. To prevent the escape of lubricant from the bearing and the entry of contaminants, there is provided an annular sealing member 18 on one side of the bearing. The flange 9a best seen on the left of the bearing in FIG. 4 is formed with a recess 9" in which the sealing member is held by the elastic tension of its integral annular bead 18'. The sealing member 18 has an annular lip 18" which extends radially outward from the bead 18' into sliding engagement with the internal faces of the cover 10 and the cylindrical recess wall in the bracket 1, and axially toward the outer bearing ring 13, thereby sealing the working elements of the bearing against contamination and loss of lubricant.

On the right side of the bearing, as viewed in FIG. 4, there is provided a gasket 19, a flat ring of oil resistant rubber or the like, which is received in the groove 9" of the corresponding collar 9b. The external cylindrical face of the gasket 19 forms a movable seal with the internal faces of the cover 10 and of the cylindrical portion of the recess in the bracket 1 in the same manner as the somewhat differently shaped sealing member 18.

The grease nipple 20 (see FIG. 4) which fastens the cover 10 to the outer bearing ring 13 has an external diameter smaller than the opening in the cover 10 through which it passes, and threadedly engages the bearing ring. A shoulder on the nipple 20 forces the cover 10 against the bearing ring 13. The grease nipple 20 is provided with a screw cap 21 so that lubricant may be forced into the bearing from the nipple by rotating the cap without actually opening the nipple to the atmosphere, as is well known.

Figure 5:
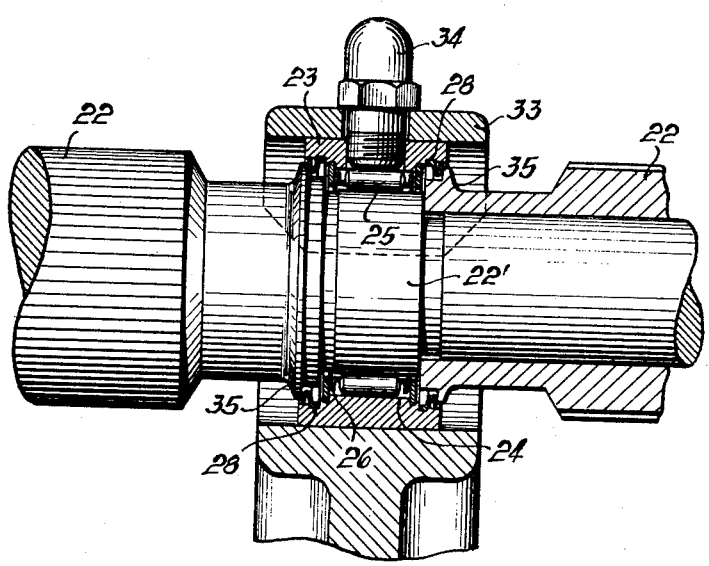
FIG. 5 illustrates yet another bearing arrangement of the invention in a view similar to that of FIG. 1.
Figure 6:
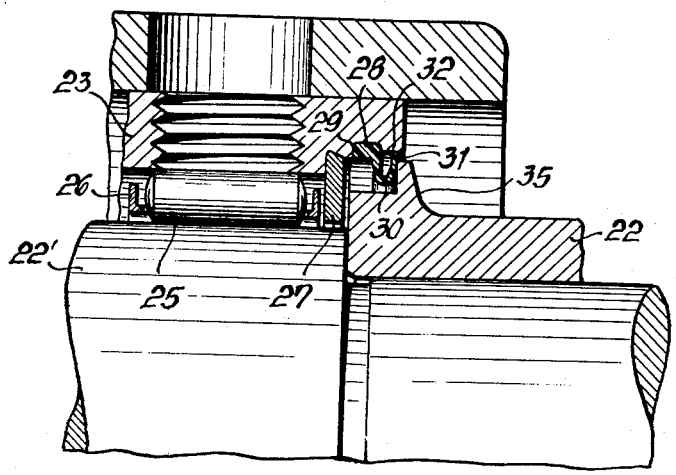
FIG. 6 shows a detail of the device of FIG. 5 on an enlarged scale.

The bearing arrangement of the invention shown in FIGS. 5 and 6 in axial section on different scales includes two sequentially arranged bottom rolls 22. A face portion of one of the bottom rolls serves as the inner bearing ring 22' on which rollers 25 rotate within the internal cambered bearing face 24 of an outer bearing ring 23. A cage 26 holds the rollers 25 in circumferentially spaced axially aligned positions. The outer bearing ring 23 is prevented from rotating relative to the bracket 1 by a cover 33 to which the ring 23 is fastened by a grease nipple 34 in the afore-described manner. Each outer bearing ring 23, cover 33, and grease nipple 34 thus form a unit which may be assembled on the bottom roll 22, and the shaft-like roll assembly may then be installed by merely sliding its several bearing units into the recesses of the corresponding bearing brackets. Slight axial misalignments are not harmful as seen from FIG. 3, since the bearing units are axially slidable in their respective recesses within adequate limits.

The sealing arrangement of the bearing illustrated in FIGS. 5 and 6 differs from those of the afore-described embodiments of this invention, as is best seen from FIG. 6, which illustrates one seal only, the other one being a mirror image of that shown. The outer bearing ring 23 is equipped with spacer rings 27 which extend toward, but do not touch the inner bearing ring 22'. The axially terminal portion of the outer bearing ring which axially overhangs the inner bearing ring 22' has an internal face 32 of larger internal diameter than the bearing ring face 24 and is additionally formed with an inwardly open annular groove 29 in the face 32.

An annular sealing member 28 has a bead which is held under compression in the groove 29 and thus fastens the sealing member to the outer bearing ring. Its lip portion 30 projects into the annular space axially enclosed between the spacer ring 27, which may be an integral portion of the outer bearing ring 23, and a radial face of a flange 35, and radially defined by the face 32 of the outer ring 23 and a cylindrical face portion of the roll 22. This annular space communicates with the bearing space proper by the narrow opening between the spacer ring 27 and the internal bearing ring 22', and with the atmosphere by an equally narrow gap 31 between the flange 35 and the ring face 32. It is thus a part of a passage which connects the bearing space with the ambient atmosphere and hinders the escape of lubricant and entry of dust and lint by its two narrow gap portions.

An additional seal is provided by the lip portion 30 of the sealing member 28. The lip portion 30 is flexed into a U-shape as seen in axial section in FIG. 6. The resilience of the sealing member thus urges the free edge of the lip portion 30 into sealing engagement with the radial face of the flange 35. The lip portion 30 also abuts against the face 32 of the outer bearing ring 33 adjacent the gap 31. The U-shape of the sealing member 28 permits some axial movement of the bottom roll 22 relative to the outer bearing ring 23 without loss of sealing effect. Any accumulation of lint on the outside of the bearing assembly near the gap 31 may be safely removed even by inexperienced personnel without any danger of injury to the relatively delicate sealing member 28 which is protected by the flange 35.

A suitable material for the resilient sealing members and gaskets of this invention is chloroprene, an oil resistant synthetic rubber, which is commercially available in a wide range of elastic properties to suit specific operating conditions for proper balance of maximum sealing effect with a minimum of friction losses in the seal.

Figure 7:
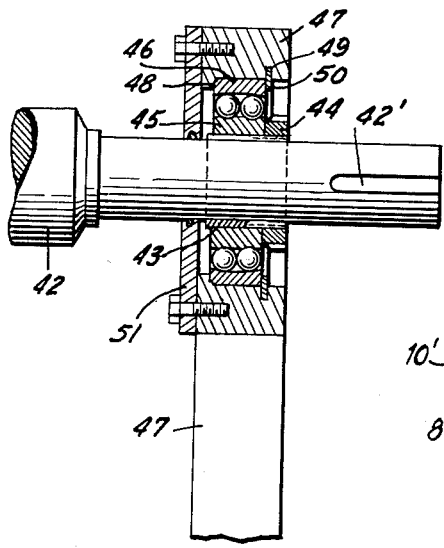
FIG. 7 shows a bearing arrangement for securing the axial position of a bottom roll assembly in cooperation with any one of the bearing arrangements illustrated in FIGS. 1 to 6.

Conventional means may be employed for securing the axial position of the bottom roll assembly, but a thrust bearing preferred for this purpose is illustrated in FIG. 7 which shows an axial end portion of the bottom roll assembly in a sectioned side elevation.

The bottom roll assembly is mounted in the spinning machine frame 41 by means of a ball bearing. A slotted conical sleeve 43 is normally slidable on the bottom roll 42, but can be locked to the bottom roll and to a coaxial inner bearing race 45 by a nut 44. The outer race 46 of the ball bearing is secured in a housing 47 fixedly mounted on the frame 41. Axial movement of the outer bearing race 46 in one direction is prevented by a shoulder 48 of the housing 47, and axial movement in the other direction by a heavy spring washer 50 which engages an annular groove 49 of the housing 47. A cover 51 axially seals the housing 47. Rotation of the bottom roll assembly is actuated by a spur gear (not illustrated) which is secured on the bottom roll assembly by a key (not shown) and keyway 42' in a known manner.

Any other thrust bearing may be employed to position the bottom roll assembly. The bearing shown in FIG. 7 permits quick assembly and disassembly, and is capable of simple axial adjustment of the bottom roll assembly after installation by merely loosening the nut 44, shifting the bottom roll assembly as needed, and re-tightening the nut.

The bearing arrangement of the invention permits combining the advantages of the known cambered bearing ring faces with means for securing the outer bearing ring against rotation in the bearing bracket which do not require critical axial spacing of the several brackets. The assembly of bottom rolls and their bearings can be installed on a drafting frame or other spinning machine simply and quickly. The assembly is secured in the brackets at least partly by its own weight.

No apertures are required in the bearing bracket, and none at the underside of the outer bearing ring which is under highest stress during operation of the spinning machine. It has been found that the provision of a continuous bearing ring portion in the highly stressed area not only increases the maintenance-free life of the bearing, but also favorably influences the stability and smooth functioning of the bearing arrangement.

The desired axial adjustability of individual bearing arrangements is possible because of the axial length of the cover. This length is preferably greater than the axial length of the recess in the bracket in which the bearing assembly is received so that the cover will close the top of the recess even if there is some lack of axial alignment. For a similar reason, the axial length of the outer bearing ring is preferably less than the corresponding dimension of the recess. The bearing ring will thus be fully backed in the recess even in the event of axial misalignment.

The bearings of the invention employ resilient sealing members which are mounted in such a manner that they are protected against accidental damage during cleaning or other maintenance operations.

The desired fixed connection between the cover and the outer bearing ring is preferably provided by a tubular member such as an ordinary grease nipple which provides an opening through which the lubricant in the bearing may be replenished. The bearing arrangements of the invention have been found to be very reliable in their operation and to be capable of trouble-free functioning over extended periods without requiring any other maintenance operations than external cleaning and lubrication.

It should be understood, of course, that the foregoing disclosure relates only to preferred embodiments of the invention, and that numerous modifications or alterations may be made therein without departing from the spirit and scope of the invention as set forth in the appended claims.

What I claim is:

1. In a bearing arrangement for bottom rolls of a drafting mechanism and the like, a support having an axially extending recess open on top and the axial ends thereof, outer bearing ring means in said recess, a bottom roll having a portion substantially coaxial with said ring means and defining an annular bearing space therewith, said bottom roll being rotatable relative to said ring means about the common axis, a plurality of antifriction elements disposed in said bearing space for rolling contact with said ring means and bottom roll during rotation of the latter, a cover member extending over the open top of said recess and releasably engaging said support, and securing means for releasably securing said cover member to said ring means, said open recess ends being unblocked, and said bottom roll together with said antifriction elements, ring means, cover member, and securing means being movable as a roll assembly in said recess in axial direction without impairing the working conditions.

2. In a bearing arrangement for bottom rolls of a drafting mechanism and the like, a support having an axially extending recess open on top and the axial ends thereof, outer bearing ring means in said recess, a bottom roll having a portion substantially coaxial with said ring means and defining an annular bearing space therewith, said bottom roll being rotatable relative to said ring means about the common axis, a plurality of antifriction elements disposed in said bearing space for rolling contact with said ring means and bottom roll during rotation of the latter, a cover member extending over the open top of said recess and releasably engaging said support, securing means for releasably securing said cover member to said ring means, flange means on said bottom roll, said flange means having two axially spaced radially extending faces, one of said faces facing said bearing space, and a sealing member interposed between said flange means and ring means, said sealing member being in sealing engagement with said one face, said open recess ends being unblocked and rendering said ring means, cover member, and securing means axially movable as a unit.

3. In a bearing arrangement for bottom rolls of a drafting mechanism and the like, a support having an axially extending recess open on top and the axial ends thereof, outer bearing ring means in said recess, a bottom roll having a portion substantially coaxial with said ring means and defining an annular bearing space therewith, said bottom roll being rotatable relative to said ring means about the common axis, a plurality of antifriction elements disposed in said bearing space for rolling contact with said ring means and bottom roll during rotation of the latter, a cover member extending over the open top of said recess and releasably engaging said support, and securing means for releasably securing said cover member to said ring means, said securing means including a tubular member formed with a central cavity, said ring means being formed with a radial aperture aligned with said cavity and forming therewith a passage through said cover member and ring means toward said antifriction elements, said open recess ends being unblocked and rendering said ring means, cover member, and securing means axially movable as a unit.

4. In a bearing arrangement for bottom rolls of a drafting mechanism and the like, a support having an axially extending recess open on top and the axial ends thereof, outer bearing ring means in said recess, a bottom roll having a portion substantially coaxial with said ring means and defining an annular bearing space therewith, said bottom roll being rotatable relative to said ring means about the common axis, a plurality of antifriction elements disposed in said bearing space for rolling contact with said ring means and bottom roll during rotation of the latter, a cover member extending over the open top of said recess and releasably engaging said support, securing means for releasably securing said cover member to said ring means, flange means on said bottom roll, said flange means having a radially extending face opposite a corresponding face of said ring means, said faces jointly defining an annular space about said axis, and a sealing member fixedly connected to one of said faces in said annular space and in movable abutting engagement with the other of said faces, said open recess ends being unblocked and rendering said ring means, cover member, and securing means axially movable as a unit.

5. In a bearing arrangement as set forth in claim 4, said sealing member having an annular portion of substantially U-shaped section in an axial plane, at least one leg portion of the U-shape extending in a radial direction and resiliently abutting against said other face.

6. In a bearing arrangement as set forth in claim 4, said flange means and said ring means jointly defining at least a portion of an annular passage extending from said bearing space outward and axially in a direction away from said antifriction elements, said recess constituting a portion of said passage, and said flange means and said ring means defining a gap constituting another portion of said passage further removed from said antifriction elements than said recess, and of substantially smaller radial width than said recess.

References Cited in the file of this patent

UNITED STATES PATENTS

| 2,592,718 | McGhee | Apr. 15, 1952 |
| 2,770,475 | Rafferty | Nov. 13, 1956 |

FOREIGN PATENTS

| 1,078,910 | Germany | Mar. 31, 1960 |
| 1,198,339 | France | June 8, 1959 |